United States Patent [19]

Rich et al.

[11] Patent Number: 5,593,724
[45] Date of Patent: Jan. 14, 1997

[54] PROCESS FOR PRODUCING A PATTERN IN A GLAZE COMPOSITION AND PREPARATION OF MOLD THEREFORE

[75] Inventors: Russell P. Rich, Lutherville; James E. Whipps, Ellicott City, both of Md.

[73] Assignee: The Burns & Russell Company, Baltimore, Md.

[21] Appl. No.: 338,186

[22] Filed: Nov. 9, 1994

Related U.S. Application Data

[62] Division of Ser. No. 831,246, Feb. 7, 1992, Pat. No. 5,393,471.

[51] Int. Cl.⁶ .................................................. B05D 3/02
[52] U.S. Cl. .................... 427/135; 427/133; 427/271; 427/282; 427/289; 427/355; 427/376.2; 427/379
[58] Field of Search ........................... 427/133, 271, 427/379, 135, 355, 376.2, 282, 289

[56] References Cited

U.S. PATENT DOCUMENTS

| | | | |
|---|---|---|---|
| Re. 29,945 | 3/1979 | Scott | 249/80 |
| 299,566 | 6/1884 | McKnight . | |
| 404,703 | 6/1889 | Hall . | |
| 433,568 | 8/1890 | McClinton | 427/135 |
| 826,599 | 7/1906 | Normandin . | |
| 1,194,554 | 8/1916 | Seiler . | |
| 1,440,618 | 1/1923 | Nelson . | |
| 1,506,475 | 8/1924 | Burkholder . | |
| 1,917,062 | 7/1933 | Reinhard . | |
| 2,288,559 | 6/1942 | Ward | 18/61 |
| 2,413,109 | 12/1946 | Leipold | 25/41 |
| 2,689,381 | 9/1954 | Terriere | 18/60 |
| 3,114,174 | 12/1963 | Kunetka | 18/44 |
| 3,380,121 | 4/1968 | Chittenden | 18/35 |
| 3,759,481 | 9/1973 | Scott | 249/189 |
| 3,780,997 | 12/1973 | Hargraves | 261/77 |
| 3,883,109 | 5/1975 | Hahne | 249/91 |
| 3,884,444 | 5/1975 | Dashew | 249/112 |
| 3,974,996 | 8/1976 | Violet | 249/112 |
| 4,037,816 | 7/1977 | Scott | 249/83 |
| 4,229,400 | 10/1980 | Laurie | 264/225 |
| 4,798,364 | 1/1989 | Scott | 249/189 |
| 4,887,789 | 12/1989 | Harris | 249/16 |
| 4,919,388 | 4/1990 | Koike | 249/115 |
| 4,956,200 | 9/1990 | Malkowski | 427/133 |

*Primary Examiner*—Janyce Bell
*Attorney, Agent, or Firm*—Pollock, Vande Sande & Priddy

[57] ABSTRACT

A pattern is provided in a glaze composition by a series of steps which includes patterning an at least partially cured fusible enameling composition by restructuring it through the removal of material therefrom, refiring the contoured restructure of the enameling composition, and then placing an uncured glaze composition onto the restructured, refined enameling composition. The glaze composition is placed in contact with the pattern in the enameling composition. The glaze composition is then cured. The cured glaze composition and enameling composition are then separated from each other to thereby provide the desired pattern in the glaze composition, without the cost, lack of convertability, and steps of stamping or forming metal to mirror the desired pattern. Also provided is the process for producing the pattern in the fusible enameling composition.

14 Claims, 1 Drawing Sheet

PROCESS FOR PRODUCING A PATTERN IN A GLAZE COMPOSITION AND PREPARATION OF MOLD THEREFORE

This is a divisional application of Ser. No. 07/831,246, filed on Feb. 7, 1992 now U.S. Pat. No. 5,393,471.

TECHNICAL FIELD

The present invention is concerned with a process for producing a pattern in a glaze composition and is also concerned with the process for producing the patterned mold surface employed for providing the pattern in the glaze composition.

BACKGROUND ART

Filled polymeric materials have been known to provide decorative and protective surfaces to walls. For instance, it has been known to coat masonry units filled with polyesters and to form walls therefrom. The basic patent on the use of polyester as coatings for masonry units is U.S. Pat. No. 2,751,775 to Sergovic and assigned to the assignee of the present application. Over the years a number of improvements in the coating compositions for the masonry building units have been developed. For instance, U.S. Pat. No. 3,328,231 to Sergovic and assigned to the assignee of the present application, discloses a glazed masonry building block made of a cured composition of an unsaturated polyester and sand in which the sand comprises at least 50% by weight of the coating composition. The unsaturated polyester is derived from a reaction between a dicarboxylic acid, such as phthalic, maleic, fumaric, adipic, pimelic, suberic, itaconic, citraconic, succinic acids and/or an anhydride thereof, and a polyhydric alcohol such as ethylene glycol, diethylene glycol and propylene glycol. Also present in such compositions, is an unsaturated monomer such as methyl methacrylate, styrene, diallyl phthalate, t-butyl styrene and alphamethyl styrene.

Furthermore, U.S. Pat. No. 4,031,289 to Sergovic discloses coated masonry blocks, articles and compositions therefore that employ various pigments in combination with various resinous compositions to provide stain resistance when subjected to high moisture conditions and/or staining media. The disclosures of the above-mentioned U.S. Pat. Nos. 2,751,775; 3,328,231; and 4,031,289, as well as 4,329, 822 and 2,817,619 are incorporated herein by reference.

More recently, there have been some disclosures concerning texturing or providing a pattern onto a glazed building unit such as the methods disclosed in U.S. Pat. Nos. 4,533, 568 to McClinton and 4,956,200 to Malkowski, and assigned to the assignee of the present application, disclosures of which are incorporated herein by reference. However, although the methods disclosed in U.S. Pat. Nos. 4,533,568 and 4,956,200 are satisfactory for the most part, the processes disclosed therein are somewhat limited in the types of patterns and surface texture that can be achieved and create surface textures and appearances that are quite different from the pleasing relief designs possible with the instant invention. For example, the methods disclosed in these patents are not particularly suitable for providing well-defined patterns having relatively narrow raised or lowered portions. Moreover, the methods described in these U.S. patents are not especially suitable for providing distinct patterns, designs or logos that project out from the glazed surface rather than being depressed therein.

The traditional method in the industry for over 30 years of creating relief patterns in a mold has been very limited and has been accomplished through expensive bending, welding, shaping and spinning of metal to form very simple patterns and the steel has then been coated and fired with a uniform layer of enamel but the cost to produce a single mold is as high as several hundred dollars and the mold pattern cannot be changed once the metal is formed.

SUMMARY OF INVENTION

The present invention provides a method for obtaining a pattern in a glaze composition by a relatively facile and expeditious manner, as well as method for preparing the pattern surface for such purposes without the need of forming the pattern in the mold substrate, be it metal or some other material such as clay or rubber. The present invention makes it possible to provide well-defined images in a glaze composition at relatively low cost and to reuse the substrate metal to form different well-defined images at a later date.

In particular, the process of the present invention for producing a pattern in a glaze composition comprises providing a substrate of an at least partially cured fusible enameling composition, and patterning or restructuring the enameling composition by removing material therefrom to provide the desired pattern therein. Preferably the enameling composition is partially refired to fuse the open texture of enamel in the patterned area. An uncured glaze composition is coated or placed on the enameling composition. As a result, the glaze composition is placed in contact with the desired pattern in the enameling composition. The glaze composition is then cured and the cured glaze composition and enameling composition are then separated from each other to thereby provide the desired pattern in the glaze composition.

In addition, the present invention is concerned with a process for producing a pattern in a mold surface which comprises providing a substrate of an at least partially cured fusible enameling composition and patterning the enameling composition by removing material therefrom to provide the desired pattern therein.

BEST AND VARIOUS MODES FOR CARRYING OUT THE PRESENT INVENTION

Figure 1:
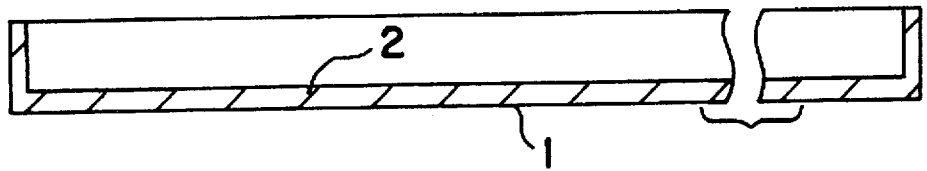
FIG. 1 is a side view and section of a mold element prior to patterning and prior to building up a thick layer or layers of partially or fully fused enameling composition pursuant to the present invention.

In order to facilitate an understanding of the present invention, reference is made to the figures. In particular, FIG. 1 is a side view and section of a mold employed in the present invention wherein a mold pan 1 is coated with an uncured fusible enameling composition 2. The mold pan is typically constructed of a metal such as steel but can be constructed of other materials capable of supporting the enameling composition such as clay. The preferred metal supports are those steel metal supports used for processing glazed masonry blocks.

The mold 1 is coated with a conventional fusible enameling composition such as glass enamel, ceramic and preferably porcelain enamel. It is essential to the success of the present invention that the coating composition employed be a fusible enameling composition since such must possess a number of crucial characteristics. For example, it is essential that the composition be capable of being patterned to provide an exact replica of the desired pattern, that such not be adversely effected or attacked by the glaze composition to be applied or by the curing conditions for the glaze composition, and be capable of maintaining its pattern even when subjected to pressure caused by masonry blocks applied thereto. Moreover, it is essential that the enameling composition and glazed composition after curing be readily separable from each other.

The enameling composition is subjected to at least a partial cure in order that the desired pattern will be maintained therein. The enameling composition can be cured or at least partially cured by firing the composition to cause fusion thereof and assure that the pattern to be subsequently provided therein will be stabilized. Typically the composition can be placed in an oven or kiln heated to temperatures of at least about 1300° F., more typically about 1300° to about 1900° F., and preferably about 1550° to about 1600° F.

Moreover, according to preferred aspects of the present invention, it is desirable that the enameling composition after at least a partial cure be fused to the underlying support or substrate such as the steel metal base. According to preferred aspects of the present invention, porcelain enamel compositions used in this art to coat a metal such as steel or a clay surface or a metal pan are employed.

Porcelain enamel compositions are generally composed of a blend of a low-sodium frit, clay, feldspar and most often other silicates, and are fusible by heating to temperatures typically above about 426° C. Typical examples of suitable porcelain enamels to be used pursuant to the present invention are available under the trade designations, "JB 797" from Ferro Corporation, porcelain enamel frit 14281 from Chi-Vit Corporation and porcelain enamel ground coat OF series available from Mobay Corporation.

Typically, the enameling composition is applied to provide a thickness of about ¹⁄₆₄ inch to about ⅜ inch and preferably about ³⁄₃₂ inch to about ¼ inch. It is important, that the thickness of the enameling composition not be significantly above ⅜ inch in order to prevent the composition after at least partial curing from flaking or delaminating from the underlying substrate and to minimize cost. Since the enameling composition and underlying substrate such as the steel expand and contract due to temperature changes at different rates, delamination of the enameling composition from the underlying substrate can occur as the thickness of the enameling composition becomes too great. This in turn could cause distortion of the desired pattern to be provided on the glaze composition. In addition, entrained air could cause unsightly blow holes in the enamel surface.

Figure 2:
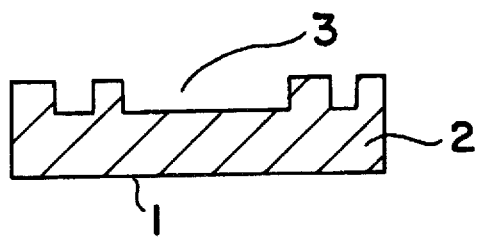
FIG. 2 is a side view in elevation in greatly enlarged detail of the partially or fully fused layers of enameling composition supported by frame such as a metal frame mold surface after patterning.

Next, the desired pattern 3 (see FIG. 2) is provided in the enameling composition by selectively removing material from predetermined locations of the enameling composition.

Typically, a mask such as a plastic or metallic mask is placed over the enameling composition to protect those portions of the enameling composition from removal. Typical methods for selective removal include abrading techniques, such as sand blasting and sand etching, grinding, diamond or abrasive cutting, caustic solution erosion and carving procedures. Removal of enameling composition to form a two dimensional enamel contour can include employing cutting tools such as routers, jigs and computer grids.

An important preferred step is refusing the two dimensional enamel contour to provide a fused shiny surface that will readily release the plastic molding or coating composition. Moreover, care must be taken while carrying out this refusing step to assure that the two different planes do not become completely liquid frit, otherwise the contour would be lost or severely sag.

By employing the enameling composition to be patterned, the present invention makes it possible to create patterns having sharply defined features, such as very sharp lines. For example, the present invention makes it possible to provide a pattern in a glaze composition exhibiting raised ridges very narrow in width which is not practical to achieve by merely forming a pattern with the metal itself without expensive stamping dies and high risk of surface metal distortion causing bellies and uneven mold bottoms. Typically, patterns formed pursuant to the present invention include at least about ⅛" of clearance between adjacent peaks and valleys of the pattern and a width of as little as about ⅛" for each peak. Furthermore, the present invention makes it possible to provide a pattern in the glaze composition that either is depressed into the glaze composition or is raised above in a relief-type relationship with the non-patterned portion of the glaze composition.

After the pattern is provided in the enameling composition, the mask is removed and, as previously specified, the enameling composition is optionally, but preferably, subjected to another at least partial cure such as by firing the composition. Typically, the composition can be placed in an oven or kiln heated to temperatures of at least about 1300° F., more typically about 1300° to about 1900° F. and preferably about 1550° to about 1600° F. This further firing provides for an increased uniformity in the surface of the subsequently obtained patterned glaze and enables easy and more reliable release of the two surfaces. Patterned glazes obtained employing molds not subjected to this further firing would be more rough.

If desired, a plurality of patterns of the same or different depth can be provided in the enameling composition by repeating the sequence of employing a mask, creating a pattern and then removing the mask as many times as different patterns are desired.

Then, after the last pattern is created and the mask removed, preferably the enameling composition with the plurality of patterns is optionally, but preferably, subjected to another at least partial cure such as by firing the composition.

Another advantage of the present invention is that after the patterned enamel is employed to provide a pattern in a glaze composition, the enameling composition can be heated to temperatures about the melt index of the composition to cause reflow of the composition back to providing a uniform layer for reuse to form another pattern therein.

Figure 3:
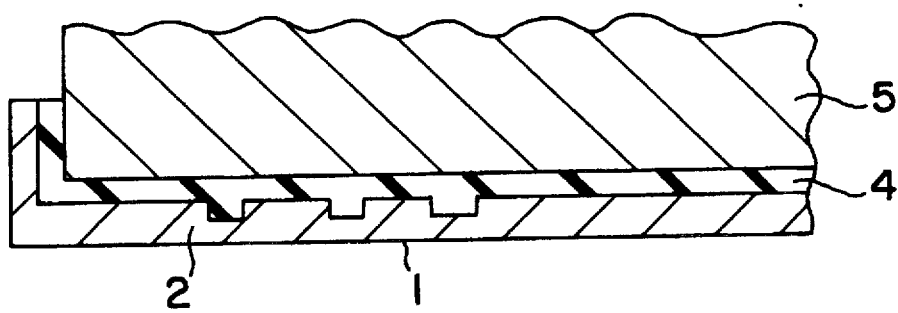
FIG. 3 is a sectional view in elevation of the mold in use in producing the pattern in the glaze composition pursuant to the present invention.
Figure 4:
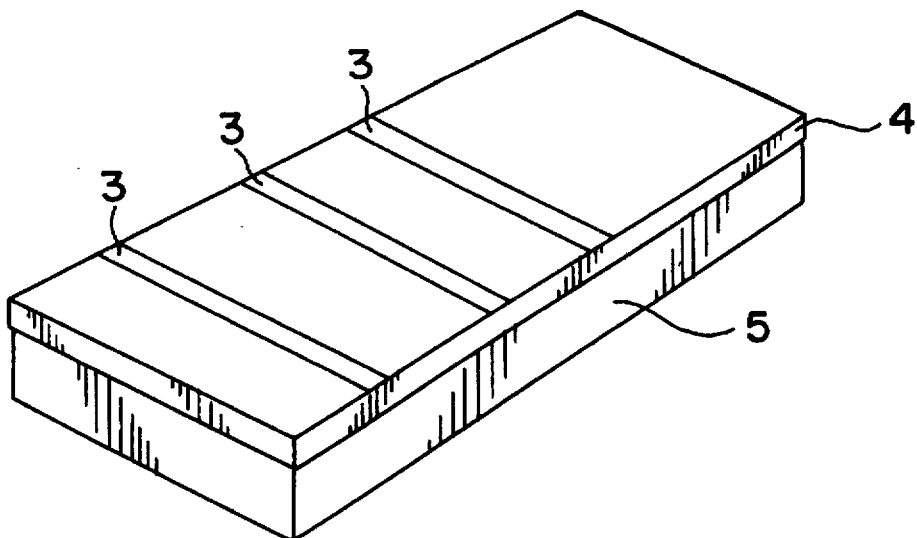
FIG. 4 is a perspective view of a patterned glazed masonry block obtained pursuant to the present invention which could result in either a glazed surface with a highly differentiated raised or lowered pattern, logo or design molded directly into the glaze and having the same smooth, impervious or textured surface as the rest of the glazed face.

In addition, according to preferred aspects of the present invention, for maximizing the smoothness of the pattern and in combination with further firing of the tooled or cut pattern, a thin layer (not shown) such as up to about ¹⁄₆₄" to about $\frac{1}{32}$" of enameling composition or as thin a layer as can be deposited is coated over those areas where the enameling composition 2 that have been removed. This is typically done prior to removal of the mask and prior to the further firing, if employed, of the enameling compositions. Next, a glaze composition 4 is applied to the patterned enameling composition to the desired thickness (see FIG. 3). Examples of suitable glaze composition are based upon the unsaturated polyester resin compositions disclosed in U.S. Pat. Nos. 2,751,775; 3,328,231; 3,632,725; 4,031,298; and 4,329,822, the entire disclosures of which are hereby incorporated herein by reference and relied upon. Also, the gel compositions disclosed in U.S. Pat. No. 2,817,619 can be used as the glaze composition, the entire disclosure of this patent is also hereby incorporated by reference and relied upon, as well as other unsaturated polymers and epoxy based glaze, casting or molding compositions.

Typical glaze compositions are in the form of relatively viscous slurries having a ratio of filler to liquid of about 2.5:1 to about 7:1 and more typically about 4.0:1 to about 4.5:1. The glaze composition can be uniformly distributed over the patterned enameling composition by employing a mechanical device such as a shaker and vibrator as known in the art. The glaze composition is typically applied to provide thicknesses of about $\frac{1}{8}$" to about $\frac{3}{4}$".

At this stage, if desired, the glazing composition can then be cured. The curing can be carried out at room temperature, if desired, depending upon the specific compositions selected. Preferably, it is carried out at an elevated temperature of about 150° F. to about 450° F. and more preferably at about 280° F. to about 320° F. Typically, the temperature of the glaze composition is raised to these levels in about 10 to about 30 minutes and held there for sufficient time such as about 2 to about 5 minutes in order to complete the polymerization. The portion of the glaze composition facing the patterned mold surface will then take on the pattern as defined by the patterned enamel surface (see FIG. 3). The cured patterned glaze composition is removed from the mold. It can then be used to provide a facing or tile for a dry wall, bricks, block or other unfinished wall substrate facing. For instance, it can be used to replace a facing at a construction site whereby a tile mortar or mortar plus mesh or wire is placed on back of the facing so that it is used to provide means for attachment to the masonry block. The wire mesh may also be incorporated into the back of the cast slab during molding as provided in U.S. Pat. No. 4,329,822 and assigned to the assignee of the present invention.

According to other aspects of the present invention, prior to curing the glaze composition, a masonry block 5 is placed in the mold on top of the glaze composition. The patterned enameling composition must have sufficient strength and integrity to retain its shape under the weight of the masonry block and is generally supported by a metal pan and fused to the metal by firing the enameling composition. The masonry block can be made from those materials employed to produce masonry blocks such as cinders, slag, cement, haydite, clay or the like. After, the block which has a surface slightly smaller than the surface bounded by the side walls of the mold pan in inserted therein, the glazing composition is cured under the same conditions discussed above. After curing, the glazed masonry unit is removed from the mold.

While the present invention has been described with respect to various preferred aspects thereof, it will be appreciated that the present invention can be implemented in a number of different ways by those skilled in the art once aware of the present disclosure to suit particular requirements. It will be understood that various changes and substitutions may be made within the spirit and scope of the invention as defined in the following claims.

We claim:

1. A process for producing a pattern in a mold surface which comprises:

subjecting a mold surface with a coating of a fusible enameling composition to elevated temperature sufficient to at least partially fuse said fusible enameling composition wherein said fusible enameling composition is selected from the group consisting of glass enamel, ceramic enamel and porcelain enamel; and patterning said fusible enameling composition by removing material from said fusible enameling composition to provide the pattern in said mold surface.

2. The process of claim 1 wherein said enameling composition is at least partially cured by subjecting the composition to elevated-temperatures of at least about 1300° F.

3. The process of claim 2 wherein said elevated temperatures are about 1300° to about 1900° F.

4. The process of claim 2 wherein said elevated temperatures are about 1550° to about 1600° F.

5. The process of claim 1 wherein said enameling composition is about $\frac{1}{64}$ inch to about $\frac{3}{8}$ inch thick.

6. The process of claim 1 wherein said enameling composition is about $\frac{3}{32}$ inch to about $\frac{1}{4}$ inch thick.

7. The process of claim 1 wherein said enameling composition prior to the at least partial cure is coated onto a mold support.

8. The process of claim 7 wherein said mold support is metal.

9. The process of claim 8 wherein said metal is steel.

10. The process of claim 1 wherein said removing is by an abrading technique employing a mask to protect portions of the enameling composition from removal.

11. The process of claim 1 wherein said removing is by grinding or carving.

12. The process of claim 1 wherein said enameling composition is a porcelain enamel.

13. The process of claim 1 wherein after the pattern is formed, the enameling composition is subjected to another at least partial fusing.

14. The process of claim 1 wherein after the pattern is formed, a layer of enameling composition is coated over those portions of the enameling composition where removal has occurred.

* * * * *